United States Patent [19]

Koff et al.

[11] 4,080,785
[45] Mar. 28, 1978

[54] MODULATING BYPASS VARIABLE CYCLE TURBOFAN ENGINE

[75] Inventors: Bernard L. Koff, Cincinnati; Raymond E. Budinger, Montgomery; James E. Johnson, Hamilton, all of Ohio

[73] Assignee: General Electric Company, Cincinnati, Ohio

[21] Appl. No.: 682,307

[22] Filed: May 3, 1976

Related U.S. Application Data

[60] Continuation of Ser. No. 519,065, Oct. 30, 1974, abandoned, which is a division of Ser. No. 445,438, Feb. 25, 1974, abandoned.

[51] Int. Cl.² .............................. F02K 1/16; F02K 3/06
[52] U.S. Cl. .............................. 60/226 R; 60/262; 415/69
[58] Field of Search .................. 60/226 R, 226 A, 225, 60/262, 224; 415/77, 79, 66, 68, 69

[56] References Cited

U.S. PATENT DOCUMENTS

| | | | |
|---|---|---|---|
| 3,368,352 | 2/1968 | Hewson | 60/226 R |
| 3,449,914 | 6/1969 | Brown | 60/226 R |
| 3,468,473 | 9/1969 | Davies et al. | 60/226 R |
| 3,514,952 | 6/1970 | Schumacher et al. | 60/226 R |
| 3,841,091 | 10/1974 | Sargisson et al. | 60/224 |
| 3,886,737 | 6/1975 | Grieb | 60/226 R |
| 3,915,413 | 10/1975 | Sargisson | 60/226 R |
| 3,937,013 | 2/1976 | Aspinwall | 60/226 R |
| 3,946,554 | 3/1976 | Neumann | 60/226 A |

Primary Examiner—Robert E. Garrett
Attorney, Agent, or Firm—Robert C. Lampe, Jr.; Derek P. Lawrence

[57] ABSTRACT

A turbofan engine is provided with a core engine, a first fan and a second fan. First and second fan ducts are provided for bypassing a portion of the air flow leaving the fans around the core engine. One of these fan ducts has its inlet disposed downstream of the second fan, while the second duct has its inlet disposed between the first and second fan. Means are provided for varying the proportion of the flow of air among the fan ducts and core engine. Integrated, or separate coaxial nozzles are provided for receiving the flows from the individual fan ducts and core engine and exhausting these flows into the atmosphere.

12 Claims, 5 Drawing Figures

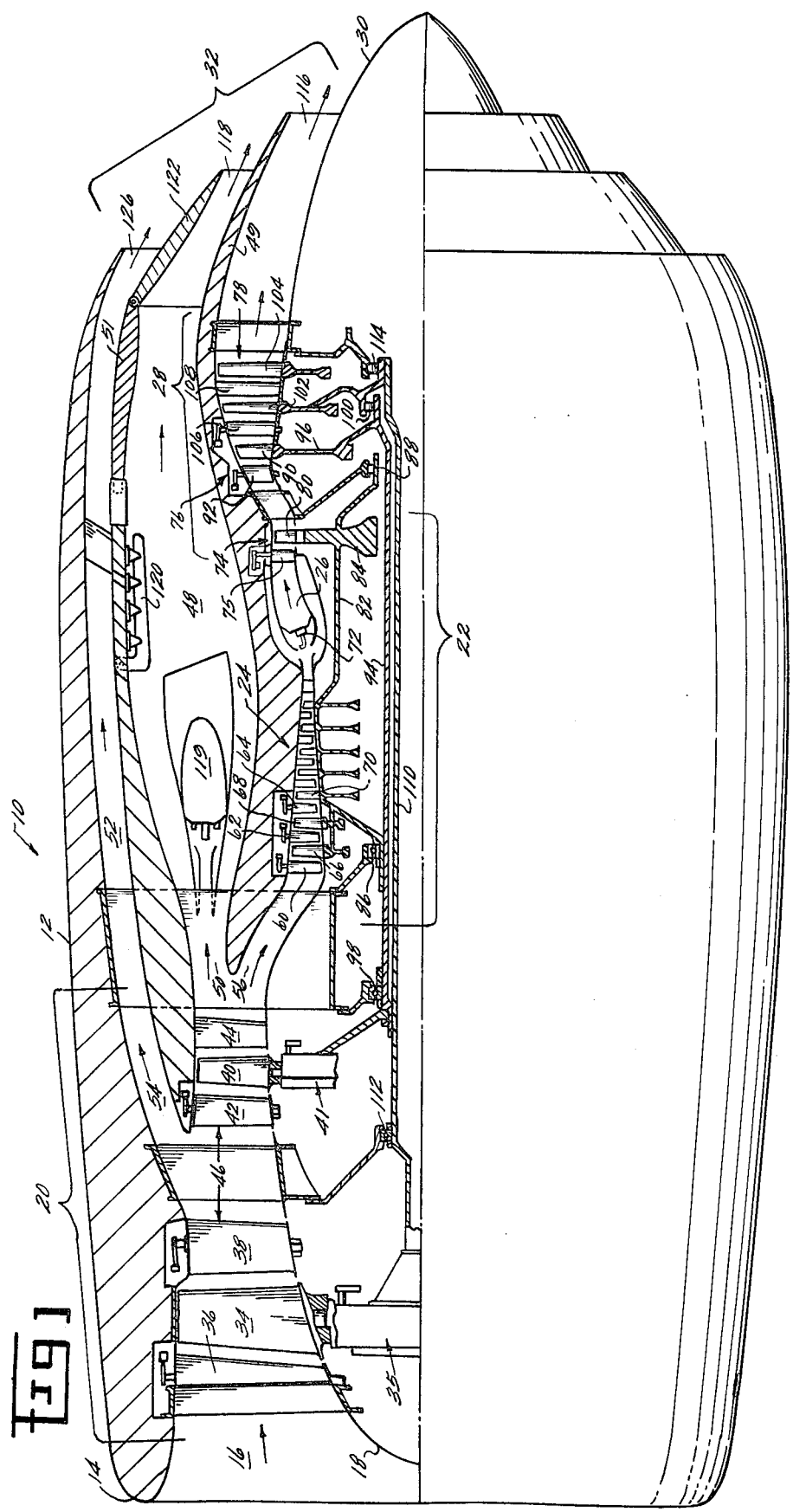

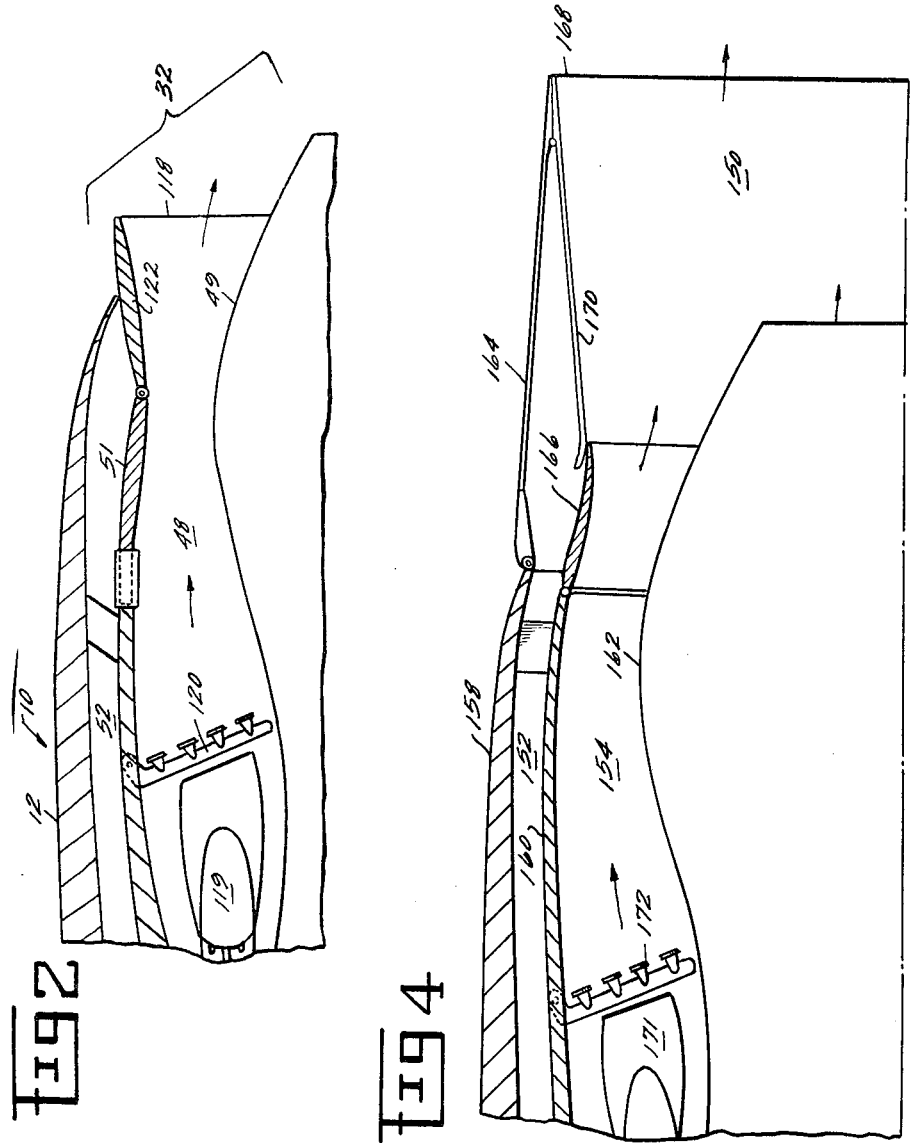

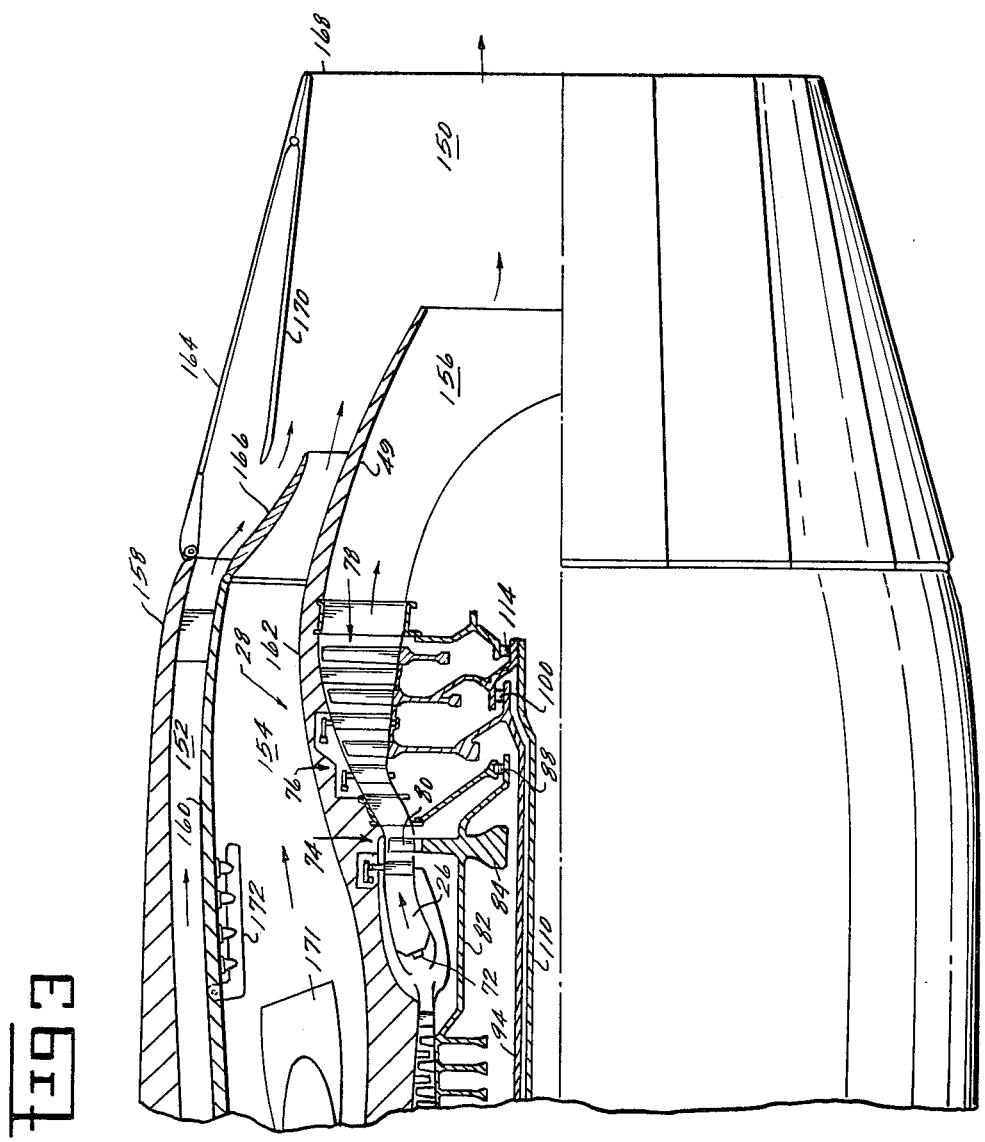

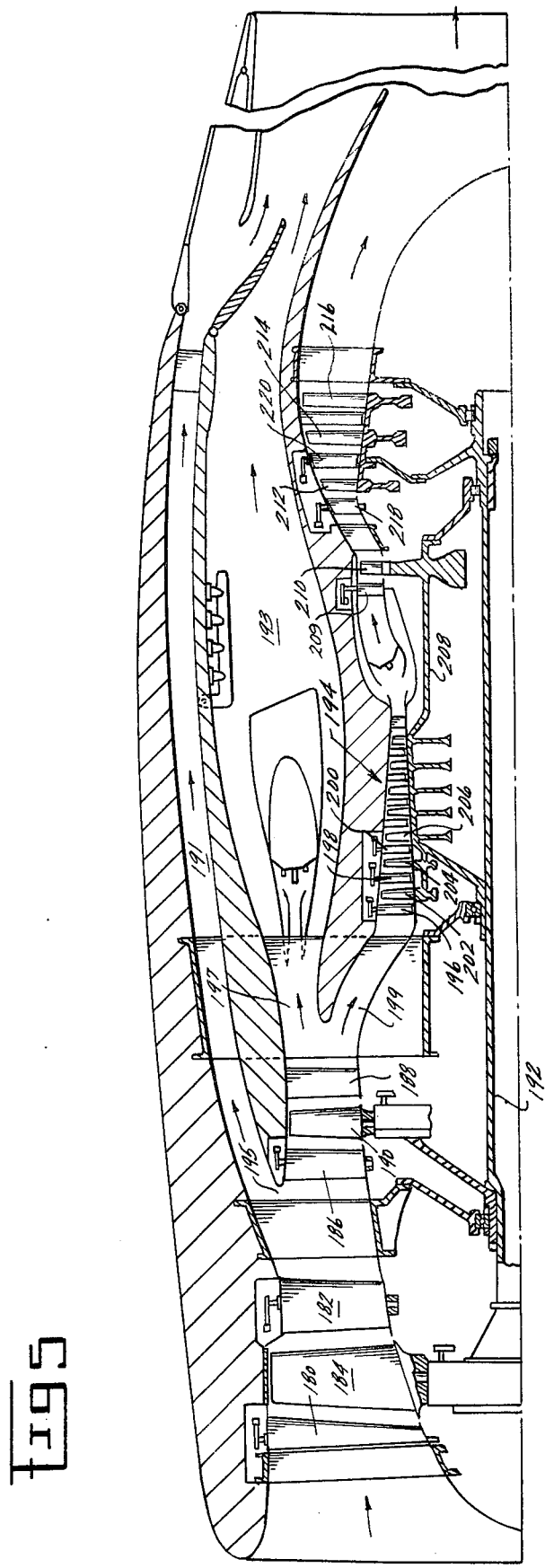

MODULATING BYPASS VARIABLE CYCLE TURBOFAN ENGINE

This is a continuation, of application Ser. No. 519,065, filed Oct. 30, 1974, which was a division of application Ser. No. 445,438, filed Feb. 25, 1974, both now abandoned.

BACKGROUND OF THE INVENTION

This invention pertains to turbofan engines and more particularly to the variable bypass ratio variety thereof.

Advanced technology turbofan engines are being designed to operate throughout a large spectrum of flight conditions. Unlike present day transports which operate primarily at subsonic speeds, advanced technology transports will operate both at subsonic and supersonic velocities. It has become apparent that engines representing prior art configurations are limited to efficient operation in one or the other, but not both, of those modes.

Low bypass turbofan engines have been found to operate most efficiently at supersonic velocities. On the other hand, high bypass ratio engines have been found to be most efficient at subsonic operation. Together, these facts have restricted prior art engine applications to one or the other operational mode. The ideal which has long been sought, and which is provided by the present invention, is a turbofan engine capable of operating both in high bypass and low bypass conditions so that a single engine can operate efficiently both at subsonic and supersonic speeds.

A contemporaneous problem has arisen with the new-found public concern in the noise generated by operating aircraft jet engines. There are many contributors within an individual engine to its overall noise output. With respect to high bypass fan engines, one of the chief contributors has been noise generated by rotating fan blades. With regard to low bypass engines, one of the chief contributors has been "jet noise" which is a result of extreme pressure and velocity differentials between the efflux from the engine and the atmosphere surrounding the engine and the shearing action between these fluids. Attempts at solving the jet noise problem have involved complex nozzle arrangements which have detracted from operating efficiency and desirable engine simplicity. The present invention employs a nozzle configuration which is uniquely suited to the operating parameters of an engine otherwise according to the present invention, in order to reduce jet noise without complicating the engine or reducing its efficiency.

With regard to prior attempts at utilization of variable bypass principles, the complexity of these attempts has led to their failure. For example, retractable fans, variable area turbines, and variable pitch fans and compressors have been designed in forms which have been inappropriate to efficient operation. One further attempted configuration involved a "compound" engine, which was designed to utilize a pair of engines in tandem with one or both engines functioning depending upon the mode of operation. Such a system has obvious failings—for example, the dead weight associated with the portions of the engine at times not in use.

A more recent attempt at designing a practical variable cycle engine involves selective direction of a fan stream through alternative fan ducts. A valving mechanism performs the switchover between ducts. One negative characteristic of this type variable bypass engine is the fact that, during switchover, at least a split second is involved wherein flow to both fan ducts is retarded, and thus fan stall is a distinct possibility. The present invention overcomes this disadvantage by providing for separate fan ducts and means for modulating air flows therethrough and varying the proportion of flows therebetween without the necessity of closing off either or both to flow. Continuous operation of at least one fan duct provides for utilization of the present invention without stall.

BRIEF SUMMARY OF THE INVENTION

It is, therefore, a primary object of the present invention to provide an improved modulating variable bypass ratio turbofan engine of a simplified form having the capability of operating efficiently and quietly at subsonic and supersonic speeds and of achieving variability between those operating modes without going through a stall condition.

In order to accomplish this, as well as further objects which will become apparent hereinafter, the present invention provides a turbofan engine having a core engine and first and second fan bypass ducts. First and second fans are provided, and the inlet to the first bypass duct is disposed downstream of both fans, with the inlet to the second bypass duct being disposed between the fans. Means such as independent rotors, variable guide vanes, variable stators, variable pitch fan blades, etc. are provided for modulating the proportions of air flow directed through each of the three engine ducts (core engine, first fan duct and second fan duct). Proper selection of operating mode for the individual modulating means, discussed hereinafter, provides for efficient operation both at low bypass and high bypass ratios.

In addition, in order to enhance suppression of engine noise, exhaust nozzles are provided in configurations involving an integrated nozzle or three coaxial and successively circumscribing annuluses. Either of these nozzles emits to the surrounding atmosphere the core flow and first and second fan streams with the slowest stream circumscribing and enveloping the second slowest stream which, in turn, circumbscribes and envelopes the fastest of the three streams. In this fashion, the fastest moving molecules are "shielded" from the surrounding stationary atmosphere by slower moving molecules in order to minimize jet noise associated with the shearing action therebetween.

BRIEF DESCRIPTION OF THE DRAWINGS

The present invention will be more clearly understood by reference to the following description thereof taken in conjunction with the appended drawings wherein:

FIG. 1 is a cross section view of a turbofan engine incorporating concepts of the present invention;

FIG. 2 is a cross section view of a portion of the engine of FIG. 1;

FIG. 3 is a cross section view of a portion of a second embodiment of the engine of the present invention;

FIG. 4 is a view of a portion of the engine of FIG. 3; and

FIG. 5 is a cross section view of a third embodiment.

DESCRIPTION OF A PREFERRED EMBODIMENT

The present invention is described hereinafter in terms of three specific embodiments thereof. These embodiments include: a three spool, triple exhaust nozzle arrangement; a two spool, integrated exhaust nozzle arrangement; and a three spool, integrated exhaust nozzle arrangement. The fundamental concepts are consistent throughout, and so the first embodiment will be described with greater particularity, general concepts thereof being applicable to the subsequent embodiments.

Referring to FIG. 1, a turbofan engine incorporating elements according to the present invention is depicted. The turbofan engine is designated generally 10 and incorporates an outer nacelle 12 which has an upstream lip portion 14 generally cylindrical in shape, and partially defines an inlet 16. Further defining the inlet 16 is a spinner or bulletnose assembly 18 generally circular in cross section and increasing in radius in the downstream direction. The inlet 16 is generally annular and occupies a predetermined cross-sectional area so that, under given operating conditions, the inlet is sized to accept a predetermined air flow.

The engine further includes a fan section 20 for receiving and compressing portions of the air flow delivered from the inlet; and a core engine 22 including a compressor 24, a combustion chamber 26, and a turbine section 28. At the aft end of the engine is a centerbody 30 and exhaust nozzle structure generally designated 32.

This engine functions in a fashion generally similar to typical turbofan engines. An air flow is ingested through the inlet 16 in FIG. 1 to be compressed by the fan section 20, whereupon a portion of the air enters the core engine 22 to be further pressurized by compressor 24 and delivered, along with high energy fuel, to combustion chamber 26. Within the combustion chamber, the fuel and air mixture is burned, thus generating a high energy "core stream" exiting the combustion chamber toward the right in the Figure. This core stream impinges and drives elements of the turbine section 28 by imparting thereto kinetic energy. The turbine section 28 transforms a portion of the kinetic energy from the core stream into torque and, by means of an appropriate shaft configuration, delivers this torque to the compressor 24 and fan section 20 for the operations thereof.

That portion of the air flow compressed by the fan section which does not enter the core engine is directed through a bypass duct, to be described, around the core engine and is not acted upon by the core engine. The ratio of the mass flow through the bypass ducts to the mass flow through the core engine is known as the "bypass ratio". As stated above, this is a highly significant parameter which affects engine efficiency and which may be varied by application of the present invention. Modulation of the flow to increase the proportion of air flow channelled through the bypass ducts increases the bypass ratio; while increasing the proportion of flow through the core engine reduces the bypass ratio.

According to the present invention, fan section 20 may be seen to incorporate a first rotatable fan rotor stage 34 disposed between stators 36 and 38, and a second rotatable fan rotor stage 40 disposed between stators 42 and 44. (Here, the fan stages 34 and 40 comprise the single-rotor fans. However, several rotor stages could be used to comprise each fan.) The fan stages 34 and 40 are axially displaced from one another by an axial space designated generally 46. In the present embodiment, each of the fan rotor stages, as well as the respective stators, incorporates a variable pitch characteristic. The pitch variation of the stators 36, 38, 42 and 44 operates as a valve to define the cross-sectional area of the engine at the respective planes thereof open to air flow. Contemporaneously, the pitch variation of the fan rotor stages 34 and 40 may assist in determining the quantity of air drawn through each respective fan stage in a single revolution during operation thereof.

For the purpose of bypassing predetermined portions of air flow past the core engine, the present invention provides a pair of bypass ducts. One of the ducts, designated generally 48, is defined between a core engine nacelle 49 and an intermediate nacelle 51 and has its inlet 50 disposed downstream of fan stage 40, the second of the rotatable fan stages. As a result, air flow directed through duct 48 will have been compressed by fan stages 34 and 40. A second fan duct 52 is defined between nacelle 51 and outer nacelle 12, and is disposed to the radial exterior of the first duct 48. This duct has its inlet 54 disposed within the axial space 46 between the rotatable fan stages. Due to this arrangement, air directed through inlet 54 and fan duct 52 will have been compressed only by the first fan 34. (If, as suggested above, multiple rotor stages comprise each fan, inlet 50 would be downstream of all rotor stages; and inlet 54 would be disposed axially between two rotor stages, one corresponding to each of the respective fans.)

Also downstream of the second fan stage 40, and generally coplanar with inlet 50, is an inlet 56 through which air is supplied to the core engine and more particularly to the core compressor 24. As can be seen from the Figure, the core compressor comprises variable geometry in its stator vanes operable as a valve to increase and decrease cross-sectional flow area into the compressor. Typical of these variable stator vanes are vanes 60, 62 and 64, with the actual number of stators being dependent upon the number of stages of the compressor. Typical compressor rotor blades are designated 66, 68 and 70.

As stated hereinabove, the core engine 22 includes a combustion chamber 26 for receiving the highly pressurized compressor discharge air along with a mixture of fuel from fuel nozzle 72. The air and fuel are mixed and ignited, with the high energy core gas stream produced by this action being expelled to the right from the combustion chamber and into contact with elements of turbine 28. The turbine 28 includes a core engine turbine 74, a first fan turbine 76, and a second fan turbine 78.

In the present embodiment, the core engine turbine 74 includes a single rotor stage 80. This rotor stage operates to extract kinetic energy from the high velocity core gas stream exiting the combustion chamber 26, and to convert this kinetic energy into torque for driving the rotor stages of the compressor. The torque generated in this fashion by core turbine 74 is carried to the compressor rotor stages by means of a shaft 82 cooperating with a disc 84, of appropriate design, upon which the plurality of turbine rotor blades are mounted forming the turbine rotor stage 80. This shaft is made rotatable by means of bearing arrangements such as illustrated at 86 and 88. The speed at which shaft 82 (and hence the compressor rotor stages) rotates is determined by the speed at which turbine stage 80 rotates. For the purpose of controlling the rotary speed of turbine rotor stage 80, the present invention provides variable pitch inlet guide vanes (stators) 75 upstream of stage 80. Operating in a valving fashion to increase or reduce flow area into the core turbine, these vanes operate to control the rotation of the stage 80 and thereby its associated shaft 82 and compressor stages 66, 68, 70, etc.

Disposed downstream of core turbine 74, and positioned to receive the flow of hot gases leaving the core turbine, is a first fan turbine 76. This fan turbine includes a single stage 90 of rotor blades and a variable pitch inlet guide vane stator stage 92 and operates to convert kinetic energy from the core stream into torque and to deliver this torque to the rotatable fan stage 40. The torque is transmitted by means of a shaft 94 interconnecting the fan stage 40 with a disc 96 carrying the turbine blades 90. Shaft 94 is rotatable independently of shaft 82 by virtue of bearings 98 and 100, and these two shafts may be independently controlled in their respective velocities of rotation. Velocity control of shaft 94 is accomplished by means of variation of the pitch of variable stators 92 to increase or decrease cross-sectional flow area through the first fan turbine 76.

A second fan turbine 78 is disposed downstream of and is positioned to receive the core stream exiting from the first fan turbine 76. This second fan turbine includes two turbine rotor stages 102 and 104, a variable pitch inlet guide vane stator stage 106 and a fixed stator stage 108. The second fan turbine 78 transmits torque to the fan stage 34 by means of a shaft 110 extending between fan stage 34 and discs associated with turbine stages 102 and 104. This shaft 110 is made rotatable by bearings 112 and 114. The speed of rotation of shaft 110 can be controlled by the orientation of variable pitch vanes 106 to increase or decrease cross-sectional flow area and accordingly to raise or lower rotational velocity of the shaft.

Thus, each of the three shafts may be rotated at a speed substantially independently of the other two. The major advantages these three independently variable-speed spools provide in the present invention will become clear hereinafter.

Downstream of the second fan turbine 78, the high energy core stream is exhausted into the surrounding atmosphere by means of a generally annular core exhaust nozzle 116 defined between centerbody 30 and nacelle 49. Nozzle 116 is part of a tripartite configuration of nozzle 32 according to the first embodiment. The first fan duct 48 is disposed to the radial exterior of and adjacent to the core engine 22, as stated above, and carries bypass air which is eventually expelled therefrom into the surrounding atmosphere through a generally annular fan exhaust nozzle 118 defined to the radial exterior of nozzle 116 and coaxial therewith between nacelles 49 and 51.

The second bypass duct 52, introduced above, can be seen to extend from inlet 54, disposed within axial space 46 between the first and second fan stages, downstream to a third generally annular exhaust nozzle 126 defined to the radial exterior of nozzle 118 between nacelle 51 and casing 12. This second fan duct operates to bypass a second quantity of air flow past the core engine, and also past the first fan duct 48. The efflux from each nozzle provides a propulsive thrust toward the left in FIG. 1. Hence, the total thrust of the engine is the sum of the thrusts of the three individual flows.

It has already been stated that turbofan engines have been found to be more efficient with high bypass ratios at subsonic velocities and with low bypass ratios at supersonic velocities. In order to accomplish highly efficient operation in both modes of operation and according to a major objective, the present invention provides means for increasing and decreasing the bypass ratio during engine operation. Moreover, this bypass ratio modulation is accomplished in a fashion which avoids circumstances inducing fan stall by maintaining a flow through at least one of the two fan ducts 48, 52 at all times including during transition between various bypass ratios. The means for proportioning the flow among the bypass ducts and core engine will now be described.

By virtue of the presence of fan ducts 48 and 52 (having their inlets 50 and 54 respectively disposed as described above), a predetermined quantity of air flow entering inlet 16 may be divided and routed through the core engine 22, through the first fan duct 48 and through the second fan duct 52 in various proportions so that the bypass ratio is varied. More particularly, increasing the proportion of air flow directed through fan ducts 48 and 52, while maintaining constant flow or reducing flow through core engine 22 results in a high bypass ratio.

The disposition of the inlet 54 to duct 52, as compared to the inlet 50 of duct 48 and the inlet 56 of the core engine 22 combines with the variable geometry of several of the operating members introduced above to permit variation of the bypass ratio. The rotatable fan blades 34 of the first fan stage are pivotable about their axes as indicated above and may be varied in pitch by means of an actuator 35. A first predetermined pitch of the fan blades 34 corresponds to operation in a mode wherein the maximum quantity of air is drawn through the fan stage per revolution. Similarly, a second pitch position achievable by means of mechanism 35 corresponds to operation at a minimum practicable air flow per revolution. In addition to these variable first fan stage characteristics, as has been stated hereinabove, the shaft 110 supplying driving torque to rotatable fan blades 34 may be rotated at a speed independent of the remaining shafts. This speed is determined in part by the settings of variable pitch turbine stator vanes 92. Hence, changing the rotational velocity of the fan blades 34 changes the rate of air flow drawn therethrough as does changing the pitch of the blades.

Turning now to the second fan stage, as indicated above, rotatable fan blades 40 of the second fan stage are also of a variable pitch characteristic, as indicated above, and the pitch setting may be controlled by means of a mechanism 41 of typical character. The various settings of pitch of the fan blades 40 result in increases or decreases of the quantity of air drawn through the second fan stage per revolution. In addition, the shaft 94 supplying torque to rotate fan blades 40 may be rotated at a speed independent of the remaining shafts, as indicated above. This speed is determined, in part, by the variable pitch turbine stators 106. Hence, changing the rotational velocity of the fan blades 40 changes the rate of the air flow drawn therethrough as does changing the pitch of these blades.

In order to provide further elements for controlling the distribution of air flow, the core engine also comprises variable geometry elements as introduced above. Turbine stator vanes 75 have been indicated as being variable in pitch whereby the rotational velocity of the compressor rotor blades and hence the rate of flow through the compressor 24 can be controlled. This control is dependent upon the fact that shaft 82, extending between turbine stage 80 and the compressor rotor stages 66, 68, 70, etc., is rotatable independently of shafts 94 and 110.

In operation, "high-flow" running (that is, rapid rotation and/or high pitch setting) of first fan stage 34 coupled with "low-flow" running (that is, slow relative rotation and/or low pitch setting) of the second fan stage 40 will result in a high bypass ratio. More particularly, in this mode, a large quantity of air will be drawn through inlet 16, and only a small fraction thereof will pass through the core engine and fan duct 48. The remaining large proportion will be forced through bypass duct 52, due to the inability of the "low-flowed" second fan to accept it.

"Low-flow" running of first fan stage 34 coupled with "high-flow" running of second fan stage 40 will result in a low bypass ratio since the second fan can accept, in this mode, substantially all the flow drawn through inlet 16. During such operation, flow through fan duct 52 is essentially zero, and the nozzle segment 122 can be positioned as shown in FIG. 2 to define an efficient converging-diverging nozzle for duct 48 as well as to close off duct 52.

During each such mode of operation, the speed of rotation and stator settings of core compressor 24 can be varied (the former by variation of turbine stators 75). Thus, the bypass ratio can be further modified in each mode by drawing more or less of the flow passing fan 40 through the core engine. In addition, in each mode, the core engine can thereby be set at its most efficient operating speed and temperature to optimize fuel utilization.

In addition to supersonic and subsonic cruise (characterized by the foregoing low-bypass and high-bypass conditions), a third operating condition is the take off or high acceleration condition wherein the engine is called upon to deliver maximum thrust. In this situation, the bypass ratio is secondary in importance and the present invention permits the achievement of an intermediate bypass ratio appropriate for the delivery of maximum thrust. Both the first and second fan stages are set for maximum air flow therethrough. As a result, the over all fan pressure ratio reaches a maximum and, therefore, the thrust is likewise maximized. Utilization of an augmentor 119 disposed within duct 48 can be made both in this situation as well as in the supersonic flight situation. The augmentor includes a retractable flameholder 120 shown retracted in FIG. 1 and operable in FIG. 2. While such an augmentor is not necessary to the concepts of the present invention, it does add flexibility by providing means to greatly increase the energy of the stream exiting nozzle 118 and thus to supplement the overall thrust of the engine.

During engine operation as it becomes necessary or desirable to modulate bypass ratio, the position of the variable turbine stators 75, 92 and 106 can be changed in order to increase and decrease the relative speeds of fans 34 and 40 and the core compressor. In this way and by varying the pitch of fans 34 and 40, the bypass ratio is infinitely variable between a peak (representing maximum total flow through ducts 48 and 52 and minimum through the core engine 22) and a minimum ratio (representing minimum flow through the fan ducts and maximum through the core engine).

According to a major objective of the present invention, this modulation may be effected without the necessity of a "switchover" between ducts or other flow stagnation point. Thus, bypass modulation need not involve the risk of fan stall characteristic of prior art devices.

The remaining previously described variable geometry elements of the first embodiment of the present invention serve to supplement flow modulation as well as to enhance operating efficiency. For example, variable pitch stators 36 and 38 of the first fan and 42 of the second fan will affect the quantity of air passing through each depending upon their respective settings. In addition, each affects the angle of attack of the air flow with respect to respective downstream stages and thus can be used to enhance aerodynamic efficiency within the engine. (The same is true with respect to stages 60, 62 and 64 of the core compressor).

The flexibility provided by the variable geometry and variable cycle characteristics of the present invention permit selection of core temperature, engine total flow and pressure ratio for optimum performance characteristics at any given flight condition.

While the present invention, thus described, is effective to improve subsonic and supersonic operating efficiency by permitting low bypass and high bypass operation, it also provides improvements in operating efficiencies based upon reduction of drag and friction losses. Previous experience has indicated that drag associated with a turbofan engine is increased when the size of the inlet is too large for the quantity of air passing through the engine in any given operating mode; in other words, "spillage" of air occurs as the inlet is advanced through the atmosphere due to the inability of the inlet to swallow all of the air it encounters. Prior art turbofan engines have no effective way of combating the effect.

The present invention reduces drag by permitting the inlet to be sized in a conventional fashion for operation at supersonic, low bypass conditions. With regard to low bypass operation, this may be accomplished by selecting a size for the fan stages such that the second stage 40, in its high throughput mode of operation, can accept all of the air passed through the first fan section rotor blades 34. In this case, the quantity of air bypassed through the outer fan duct 52 would be reduced to near zero and the bypass ratio held to an acceptable low value for supersonic operation while permitting the inlet to pass through the atmsophere without the occurrence of spillage.

With regard to subsonic, part-power and high bypass operation, the flow through the engine can be "matched" to inlet requirements by diverting a large proportion of the incoming flow through the duct 52. Thus, the relatively low thrust and fuel useage can be maintained while directing air flow through the duct 52 which would otherwise be "spilled" at the inlet.

With regard to drag losses, the "spillage" losses associated with inlet dimensioning are ordinarily supplemented in negative effect by external nozzle drag losses. These losses generally arise from the "boattail" effect associated with the convergence of the aft end of the engine and air flows associated therewith. In prior art turbofan engines, this effect is particularly harmful to operating efficiency during cruise operations of the engine. Making use of the present invention, such partial power operation can be significantly improved in boattail drag loss. To accomplish this, the inlet flow can be matched to air speed velocity to eliminate spillage as before by proper selection of air flow quantity through the first fan stage. At the same time, reducing the flow through the second fan stage will yield high bypass through the outer fan duct 52. The outer bypass flow can be matched to external flow conditions to minimize drag losses associated with the boattail effect by increasing the volumetric flow through the throat of the exhaust nozzle proximate the external atmosphere—that is, nozzle 126. These various flow matchings cannot effectively be made utilizing prior art turbofan engine principles (including prior art variable cycle principles).

Thus, it can be seen that the present invention offers the opportunity to achieve an optimum trade between various operating parameters, including inlet drag (due to spillage), boattail drag (remedied by increasing volumetric flow through the nozzle throat) and core engine internal efficiency (improved by matching core speed and core temperatures at optimum values). Hence, the present invention offers an extremely flexible turbofan engine having radically improved functional characteristics when compared to prior art engines.

Referring now to FIGS. 3 and 4, a second embodiment of the present invention is depicted. The variation between this second embodiment and the foregoing embodiment is limited to the exhaust nozzle structure which will be fully described in conjunction with the nozzle structure of FIG. 1 hereinafter.

A third embodiment of the present invention is depicted in FIG. 5. This embodiment incorporates a nozzle according to the second embodiment. In addition, this embodiment depicts a "two-spool" configuration as opposed to the "three-spool" configuration of the first embodiment. That is, two independently rotatable shafts are involved, rather than three. The first fan stage has variable stator vanes 180 and 182 and variable pitch rotor blades 184. The second fan stage has variable pitch vanes 186 and fixed vanes 188 as well as variable pitch rotor blades 190. The first fan stage rotor blades 184 and the second fan stage rotor blades 190 are mutually carried and driven by a single shaft 192. First and second fan ducts 191 and 193 are provided with inlets 195 and 197 disposed as in earlier embodiments. The core compressor 194 has an inlet 199 and includes variable stator vanes 196, 198 and 200, etc., as well as fixed stator vanes. In addition, the core compressor includes rotor blades 202, 204 and 206 carried by a shaft 208 rotatable independently of shaft 192. Referring now to the core turbine, a rotor stage 210 is mounted upon a disc which cooperates with and drives shaft 208 and is disposed downstream of variable inlet guide vane stators 209. Rotor blades 212, 214 and 216 cooperate with and drive shaft 192 and thus comprise the fan turbine. In addition, the fan turbine includes variable pitch stator vanes 218 and 220.

With the exception of the substitution of two independently driven shafts, rather than the three shafts of the first embodiment, the embodiment of FIG. 5 operates in the same fashion as does that of FIG. 1. Bypass ratio variation is accomplished by proportioning flow of air among the core engine and ducts 191 and 193. The flow proportioning in this embodiment is achieved primarily by means of variation of the pitch settings of fan stages 184 and 190 and by fan and core speed variation. Fan speed variation is accomplished by adjusting the pitch of fan turbine stators 218 and 220; but, in this embodiment, the fans are driven by a single shaft and thus at equal speeds. Core compressor speed variation is accomplished by adjusting the pitch setting of the core turbine stators 209.

As in the embodiment of FIG. 1, increasing the proportion of air flow directed through fan ducts 191 and 193 also increases bypass ratio; while increasing the proportion of flow through the core engine decreases bypass ratio. This embodiment, while inherently less flexible than the foregoing embodiment of FIG. 1 due to equality of speeds of fan stages 184 and 190, offers reduced weight and reduced complexity, and might prove beneficial or preferable on these bases.

Turning now to the jet noise suppression problem, FIGS. 1 and 2 illustrate a first nozzle arrangement for treating jet noise in an effective fashion—and a fashion easily applicable to an engine already incorporating characteristics of the present invention. Despite the fact that the core stream has passed through three separate turbines between the combustion chamber and the nozzle 116, the exiting core stream comprises extremely high velocity molecules, and its projection into a generally zero velocity surrounding atmosphere would create a large quantity of such undesirable jet noise.

This would be the case due to the "shearing" interaction between the high-velocity core stream molecules and the relatively static atmospheric molecules.

In the embodiment of FIG. 1, the triple or tripartite exhaust nozzle structure 32 comprising core nozzle 116, first fan exhaust nozzle 118 and second fan exhaust nozzle 126, serves to reduce the relative velocity between molecules of the various exiting streams and the surrounding atmosphere. This is accomplished by the disposition of the three generally annular exit nozzles in generally coaxial and coplanar relationship. Nozzle 116 is generally circumscribed by nozzle 118. Similarly, nozzle 118 is generally circumscribed by nozzle 126. As a result, the core stream exiting the engine is enveloped by the first fan stream exiting nozzle 118. Both of these streams are enveloped by the second fan stream exiting at nozzle 126. As has been described hereinabove, the core stream 116 exits the engine with a very high velocity; the first fan stream exits nozzle 118 with a substantially smaller velocity (since it has not been acted upon by core engine 22); and the second fan stream exits nozzle 126 at a velocity less than either of the other two (since it has been compressed by only one fan).

In this fashion, direct interaction with the core stream is limited to the first fan stream, while the first fan stream directly interreacts with the core stream and second fan stream. The second fan stream is the only effluent of the engine which directly engages the relatively stationary atmospheric air near the engine exhaust. In this fashion, then, the relative velocities between molecules are substantially minimized through exhaust stream "blending" by the nozzle arrangement of the present invention. This results in substantial improvement in the suppression of jet noise since shear forces between interacting molecules of each of the streams are generally minimized.

Another characteristic of the nozzle structure of FIGS. 1 and 2 is that it permits efficient flow expansion in either the low or high bypass flow modes. In FIG. 1, flap 122 at the downstream extremity of nacelle 51 is disposed in a position appropriate for high-bypass, subsonic operation. In this configuration, the flap 122 defines exit surfaces for both outer fan nozzle 126 and intermediate fan nozzle 118, each nozzle emitting a substantial flow into the atmosphere. Each is a converging nozzle approaching its downstream extremity, with flow expansion occurring primarily externally and downstream of the nozzle.

In FIG. 2, flap 122 is shown swung into a position suitable for low-bypass supersonic operation. In this configuration, flow through the outer fan duct 52 has essentially ceased, while flow through inner fan duct 48 is substantial (and may be augmented). Appropriate for this situation is the converging-diverging nozzle configuration now comprising nozzle 118 wherein primary flow expansion occurs internally and prior to expulsion into the surrounding atmosphere.

Hence, in addition to suppressing jet noise, the present nozzle configuration enhances overall engine performance by aiding efficient aerodynamic expansion.

While the three-stream flows of the present invention are particularly well-suited to use with the triple exhaust nozzle of FIG. 1, a generally equivalent sound-suppression and performances model can be achieved by the nozzle configuration of FIGS. 3 and 4.

Basically, this second nozzle embodiment utilizes an integrated exhaust nozzle 150 which operates as a mixing chamber for receiving flow from the outer fan duct 152, the inner fan duct 154, and the core engine exhaust 156. (The outer fan duct 152 is defined between outer nacelle 158 and an intermediate nacelle 160. Fan duct 154 is defined between the intermediate nacelle 160 and a core engine nacelle 162.) The outer nacelle and intermediate nacelle incorporate variable geometry configurations including variable nozzle flap sections 164 and 166, respectively. The integrated nozzle 150 is defined within an annular extension 168 of the variable nozzle flap structure 164. The extension 168 includes an upstream extending annular member 170 which reaches a point proximate variable nozzle structure 166 and permits closure of the outer fan duct when flow therethrough is ceased.

In operation in subsonic, high bypass configuration, as shown in FIG. 3, a large flow occurs through outer fan duct 152 with smaller flows through duct 154 and the core exhaust 156. As the flow from each source reaches the downstream extremity of its respective duct, it is discharged into the integrated nozzle 150 wherein a predetermined intermixing occurs. Thereupon, the flow is discharged into the surrounding atmosphere with a velocity profile wherein the slowest velocities occur toward the radial exterior thereof and the greatest velocities are retained in the center of the flow. In this fashion, the nozzle of this embodiment is similar to the nozzle of the foregoing nozzle embodiment. But in this second embodiment intermixing of the various flows occurs within the integrated nozzle 150 as opposed to downstream of separate nozzles. As a result, a smoother velocity profile can be obtained at the point of interaction between the exiting flow and the surrounding atmosphere. Both embodiments are extremely effective toward the reduction of noise as well as enhancement of the operating efficiency of the engine. Selection therebetween may be made largely on the basis of mechanical preference.

In FIG. 4, the second embodiment is depicted as it appears in the supersonic mode of operation, and also wherein the afterburner 171 with its retractable flameholder 172 is functioning. In this mode, as in the prior embodiment, the flow of air through the outer fan duct 152 is substantially negligible with the entire incoming air flow being divided between inner duct 154 and the core engine. The variable geometry of the nozzle structure including elements 164, 166 and 170 have effected closing of the outer fan duct by means of rotation of nozzle element 166 into engagement with the upstream extending member 170. In addition, this rotation of the nozzle element 166 has transformed the exit from the inner fan duct 154 from a converging to a converging-diverging configuration preferable for supersonic flight. In this fashion, the bypass ratio of the engine is reduced and the flows from fan duct 154 and the core engine exit are intermixed within the integrated nozzle 150 before being exhausted into the atmosphere.

Thus, as described in these embodiments, the present invention provides an extremely flexible turbofan engine concept which is adaptable to high efficiency operation at takeoff, maximum acceleration, subsonic partial thrust, and supersonic operation. Contemporaneously, the present invention solves noise problems which have heretofore been particularly bothersome. It is obvious that those skilled in the art will be enabled by virtue of this disclosure to make numerous variations of these embodiments without departing materially from the spirit of the present invention. For example, numerous variations of these embodiments might be made by which the flow through the various fan ducts and core engine might be modulated by means other than those disclosed. Also, as indicated, the overall flexibility of the configurations illustrated herein may be sacrificed in measured degree for simplicity by incorporating fewer variable geometry elements. Furthermore, the nozzle structures herein defined might be varied but yet achieve similar objectives. Such variations as well as others of a similar nature may be accomplished without departing from the scope of the appended claims.

What is claimed as new and desired to be secured by Letters Patent of the United States is:

1. A turbofan engine comprising:
   a first fan stage driven through a shaft and including first rotatable fan blades;
   a second fan stage including second rotatable fan blades disposed downstream of said first fan stage and separated from the first fan stage by a first space;
   a core engine for pressurizing a core stream and having a core inlet, a core compressor, a combustion chamber, a core turbine and a core shaft drivingly connecting said core compressor and said core turbine, wherein the core inlet is disposed downstream of said second fan stage and separated from said second fan stage by a second space;
   a first fan duct for directing a first fan stream and having a first inlet disposed within said second space;
   a second fan duct generally coannular with the first fan duct for directing a second fan stream and having a second inlet disposed within said first space;
   first modulating means for varying flow through the first fan stage;
   second modulating means for varying that portion of the flow passing through the first fan stage, as established by the first modulating means, which also passes through the second fan stage, the remainder of the flow passing through the first fan stage comprising the second fan stream;
   fan turbine means drivingly connected to said first and second fan stages, said fan turbine means being driven entirely by the pressurized core stream;
   a core exhaust nozzle for expelling the core stream into the atmosphere;
   a first fan exhaust nozzle for expelling the first fan stream into the atmosphere, said first fan exhaust nozzle generally circumscribing said core nozzle; and
   a second fan exhaust nozzle for expelling the second fan stream into the atmosphere, said second fan exhaust nozzle generally circumscribing said first fan exhaust nozzle.

2. The engine of claim 1 further including:

a first fan turbine;

a first fan shaft cooperating with the second fan stage and the first fan turbine;

and wherein said second modulating means comprises first variable pitch turbine stators within said first fan turbine and first speed control means for varying the pitch of said first turbine stators;

whereby the speed of said first fan shaft and said second fan stage are controlled.

3. The engine of claim 1 wherein:

said core compressor includes variable pitch compressor stators; and said core shaft is rotatable at speeds different from that of the second fan stage.

4. The engine of claim 3 further comprising:

a first fan exhaust nozzle for directing flow from said first fan duct;

a second fan exhaust nozzle generally coaxial with and disposed to the radial exterior of said first fan nozzle for directing flow from said second fan duct;

a generally annular core exhaust nozzle disposed to the radial interior of said first fan nozzle; and means for closing the second fan nozzle to flow.

5. The engine of claim 3 wherein said first modulating means includes first variable pitch fan blades in said first fan stage.

6. The engine of claim 3 wherein said first modulating means includes first variable pitch stators in said first fan stage.

7. The engine of claim 3 wherein said second modulating means includes second variable pitch fan blades in said second fan stage.

8. The engine of claim 3 wherein said second modulating means includes second variable pitch stators in said second fan stage.

9. The engine of claim 5 wherein said first modulating means further includes first variable pitch stators in said first fan stage, and said second modulating means includes second variable pitch fan blades and second variable pitch stators in said second fan stage.

10. The engine of claim 2 further comprising:

second variable pitch turbine stators included within the core turbine; and second speed control means for varying the pitch of said core turbine stators, whereby the speed of said core shaft and said compressor are controlled to modulate the flow therethrough.

11. The engine of claim 10 further including:

a second fan turbine, including third variable pitch turbine stators;

a second fan shaft cooperating with the first fan stage and the second fan turbine; and third speed control means for varying the pitch of said third turbine stators, whereby the speed of said second fan shaft and said first fan stage are controlled.

12. The engine of claim 10 wherein said first fan shaft also cooperates with said first fan stage.

* * * * *